US012693407B2

(12) United States Patent
Ho et al.

(10) Patent No.: US 12,693,407 B2
(45) Date of Patent: Jul. 28, 2026

(54) DETECTING SYSTEM AND DETECTING METHOD FOR MOVEMENT TRAJECTORY

(71) Applicant: Wistron Corporation, New Taipei City (TW)

(72) Inventors: Shu Shiuan Ho, New Taipei City (TW); Yao-Tsung Chang, New Taipei City (TW); Yin-Yu Chen, New Taipei City (TW); Yu Hsuan Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 303 days.

(21) Appl. No.: 18/412,620

(22) Filed: Jan. 15, 2024

(65) Prior Publication Data

US 2025/0189661 A1      Jun. 12, 2025

(30) Foreign Application Priority Data

Dec. 7, 2023    (TW) .................................. 112147631

(51) Int. Cl.
    G01S 13/89      (2006.01)
    G01S 7/06       (2006.01)
    G01S 13/58      (2006.01)

(52) U.S. Cl.
    CPC ................ G01S 13/89 (2013.01); G01S 7/06 (2013.01); G01S 13/58 (2013.01)

(58) Field of Classification Search
    CPC ............. G01S 13/89; G01S 7/06; G01S 13/58
    See application file for complete search history.

(56) References Cited

U.S. PATENT DOCUMENTS

| | | | | |
|---|---|---|---|---|
| 12,007,469 | B1 * | 6/2024 | Farah | G01S 7/417 |
| 12,313,771 | B1 * | 5/2025 | Chen | G01S 7/2955 |
| 2017/0102457 | A1 * | 4/2017 | Li | G01S 7/10 |
| 2019/0108740 | A1 * | 4/2019 | Coke | G01S 13/89 |
| 2019/0377062 | A1 * | 12/2019 | Barkan | G01S 13/536 |
| 2020/0049812 | A1 * | 2/2020 | Jansen | G01S 13/343 |
| 2021/0197834 | A1 * | 7/2021 | Shaker | G06V 40/25 |
| 2021/0389452 | A1 * | 12/2021 | Lau | G01S 13/347 |
| 2022/0018959 | A1 * | 1/2022 | Akahoshi | G01S 17/89 |
| 2022/0026519 | A1 * | 1/2022 | Wu | G01S 7/006 |
| 2023/0140093 | A1 * | 5/2023 | Cheng | G06N 3/09 |
| | | | | 340/573.1 |
| 2023/0341859 | A1 * | 10/2023 | Pratt, Jr. | G05D 1/0214 |

FOREIGN PATENT DOCUMENTS

| | | | | |
|---|---|---|---|---|
| CN | 113936456 | 1/2022 | | |
| TW | 202300952 | 1/2023 | | |
| WO | WO-2018071416 A1 * | 4/2018 | ............. | G01S 17/86 |

* cited by examiner

*Primary Examiner* — William Kelleher
*Assistant Examiner* — Hailey R Le
(74) *Attorney, Agent, or Firm* — JCIPRNET

(57) ABSTRACT

The present invention provides a detecting system and a detecting method for movement trajectory. The detecting method includes: transmitting a radar signal to a detection area to receive a corresponding reflected signal; obtaining a point cloud according to the reflected signal; generating a movement trajectory according to the point cloud; and displaying information associated with the movement trajectory through a graphical user interface.

18 Claims, 7 Drawing Sheets

FIG. 6 transmitting a radar signal to a detection area to receive a corresponding reflected signal ⌐S101 obtaining a point cloud according to the reflected signal ⌐S102 generating a movement trajectory according to the point cloud ⌐S103 displaying information associated with the movement trajectory through a graphical user interface ⌐S104

DETECTING SYSTEM AND DETECTING METHOD FOR MOVEMENT TRAJECTORY

CROSS-REFERENCE TO RELATED APPLICATION

This application claims the priority benefit of Taiwan application serial no. 112147631, filed on Dec. 7, 2023. The entirety of the above-mentioned patent application is hereby incorporated by reference herein and made a part of this specification.

BACKGROUND

Technical Field

The present invention relates to a detecting system and a detecting method for movement trajectory.

Description of Related Art

Moving autonomously and smoothly is an important life skill for people. Poor lower limb muscle strength due to accident, illness, or lack of training can lead to falls. People can be injured, disabled, or even killed as a result of a fall. Therefore, in recent years, medical institutions have paid great attention to the walking ability of patients, and hope to perform walking ability-related tests for patients or elderly people. However, the equipment used to test walking ability is not easy to set up and not easy to clean. Furthermore, as people become more and more privacy-conscious, testing using cameras has become less popular. Therefore, how to provide subjects with a convenient and privacy-free testing method for walking ability is one of the important issues in this field.

SUMMARY

The present invention provides a detecting system and a detecting method for movement trajectory, which can use radar to detect the movement trajectory of a subject.

An embodiment of the present invention provides a detecting system for movement trajectory, including a processor, a radar, and a display device. The display device displays a graphical user interface. The radar transmits a radar signal to a detection area to receive a corresponding reflected signal. The processor is coupled to the radar and the display device and configured to: obtain a point cloud according to the reflected signal; generate a movement trajectory based on the point cloud; and display information associated with the movement trajectory through the graphical user interface.

An embodiment of the present invention provides a detecting method for movement trajectory, including: transmitting a radar signal to a detection area to receive a corresponding reflected signal; obtaining a point cloud according to the reflected signal; generating a movement trajectory according to the point cloud; and displaying information associated with the movement trajectory through a graphical user interface.

Based on the above, the present invention may use the reflected signal of the radar to obtain a point cloud, and then generate the movement trajectory of the subject based on the point cloud. The present invention may display information related to the movement trajectory in various ways through a graphical user interface for user reference, making it easier for the user to understand information such as the dwell time, velocity, or acceleration of the subject at a specific time or location. The present invention may also determine the number of standing-sitting actions of the subject based on the point cloud, allowing the user to determine the subject's activity level based on this.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 illustrates a line chart and a pie chart corresponding to the movement trajectory according to an embodiment of the present invention.

DESCRIPTION OF THE EMBODIMENTS

Figure 1:
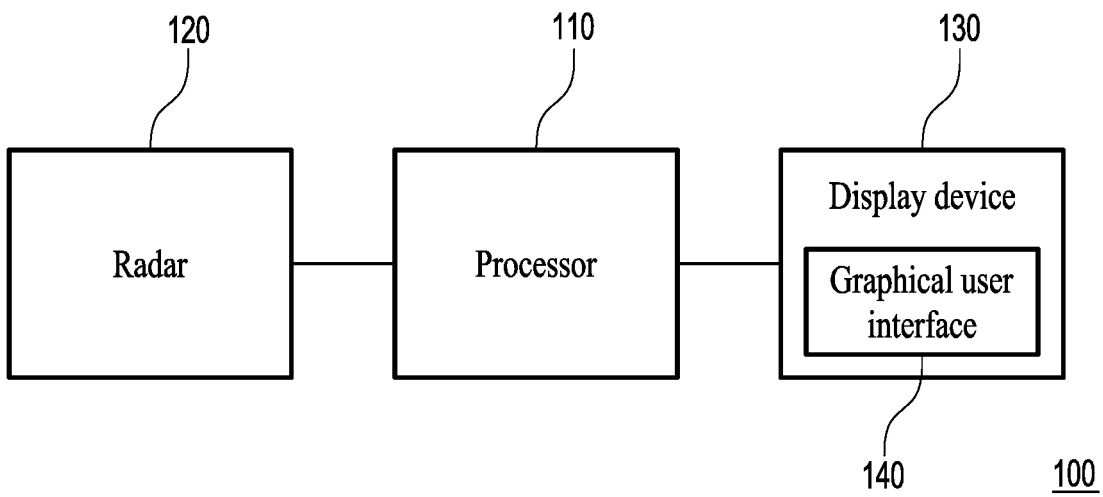
FIG. 1 is a schematic diagram of a detecting system for movement trajectory according to an embodiment of the present invention.

In order to make the content of the present invention easier to understand, the following embodiments are given as examples according to which the present invention can be implemented. In addition, wherever possible, elements/components/steps with the same reference numbers in the drawings and embodiments represent the same or similar parts.

FIG. 1 is a schematic diagram of a detecting system 100 for movement trajectory according to an embodiment of the present invention. The detecting system 100 may include a processor 110, one or more radars 120, and a display device 130. The detecting system 100 can be applied to terminal devices such as smart phones or tablet computers, but is not limited thereto.

The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar components or a combination of the above components. The processor 110 may include a storage medium for storing various modules and applications or a transceiver for communicating with external electronic devices. Processor 110 may be coupled to radar 120 and display device 130.

The radar 120 is, for example, a frequency modulated continuous wave (FMCW) radar. The radar 120 may include necessary components for performing the functions of the FMCW radar, such as an antenna, a transmitting circuit, a receiving circuit, a modulating circuit, a demodulating circuit, an analog-to-digital converter, a digital-to-analog converter, or a processor.

The display device 130 may be a liquid-crystal display (LCD), a light-emitting diode (LED) display, a vacuum fluorescent display (VFD), a plasma display panel (PDP), an organic light-emitting diode (OLED), or a field-emission display (FED). The processor 110 may display the graphical user interface 140 through the display device 130, and display information for the user to view through the graphical user interface 140.

Figure 2:
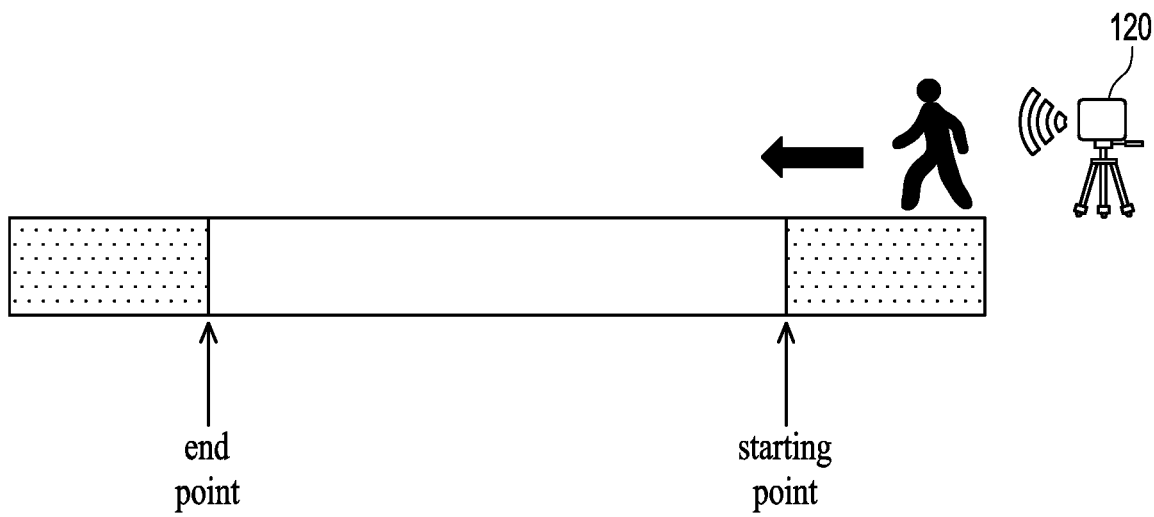
FIG. 2 is a schematic diagram of a scenario of performing a movement test according to an embodiment of the present invention.

The detecting system 100 may be used to detect the movement ability of the subject. FIG. 2 is a schematic diagram of a scenario of performing a walking ability test according to an embodiment of the present invention. The user may aim the radar 120 at a linear trail and instruct the subject to walk back and forth between the starting point and the end point of the trail. The radar 120 may transmit a radar signal to subjects in the detection area (i.e., the trail) to receive a corresponding reflected signal. The processor 110 may generate the movement trajectory of the subject according to the reflected signal, and analyze the movement trajectory to obtain information related to the movement ability of the subject. The above information may include information such as displacement, instantaneous velocity (i.e., the average velocity of the subject during a short time period), average velocity (i.e., the average velocity of the subject during a long time period), instantaneous acceleration (i.e., the average acceleration of the subject during a short time period), average acceleration (i.e., the average acceleration of the subject during a long time period), movement offset (e.g., offset ratio, average offset, or maximum offset), or dwell time, but not limited thereto.

Figure 3:
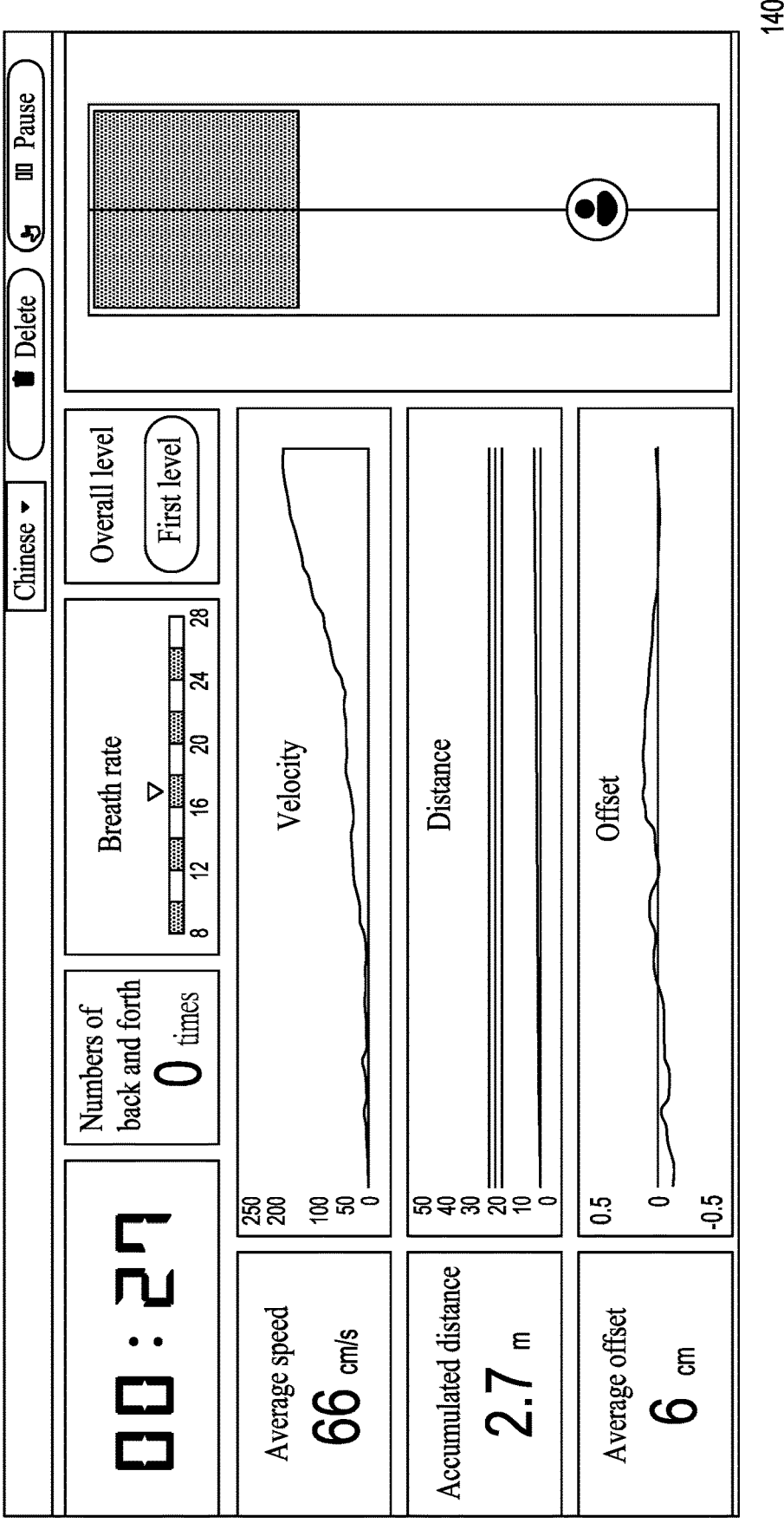
FIG. 3 is a schematic diagram of information displayed by a graphical user interface according to an embodiment of the present invention.

The processor 110 may display information through the graphical user interface 140, as shown in FIG. 3. In one embodiment, the processor 110 may input the movement trajectory into the machine learning model to obtain the walking characteristics of the subject, wherein the walking characteristics may include but are not limited to information such as displacement, instantaneous velocity, average velocity, instantaneous acceleration, average acceleration, movement offset, or dwell time. The processor 110 may calculate the activity level of the subject according to the movement trajectory and weight of the subject.

Straight lines, bends or offsets in the movement trajectory may reflect the walking ability of the subject. For example, a doctor may access the symmetry between the left and right feet of the subject while walking according to the movement trajectory of the subject, and then evaluate the balance ability of the subject or the level of rehabilitation from stroke or limb injury.

Figure 4:
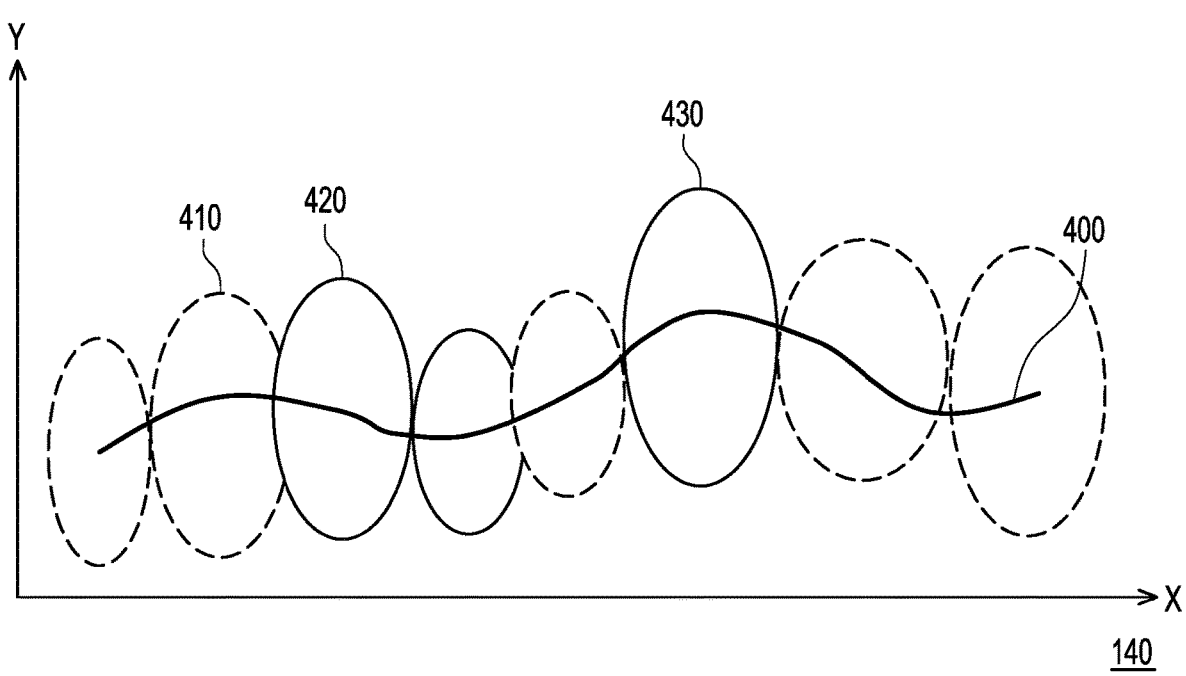
FIG. 4 is a schematic diagram of a movement trajectory displayed by a graphical user interface according to an embodiment of the present invention.

FIG. 4 is a schematic diagram of a movement trajectory displayed by a graphical user interface according to an embodiment of the present invention. The processor 110 may generate the movement trajectory 400 of the subject based on the point cloud, and display information associated with the movement trajectory 400 through the graphical user interface 140 for user reference. Specifically, the processor 110 may transmit a radar signal to the subject in the detection area through the radar 120 to receive a corresponding reflected signal, and may obtain the point cloud according to the reflected signal.

In one embodiment, the processor 110 may obtain environmental information of the detection area. The processor 110 may filter some sample points in the point cloud according to the environmental information to update the point cloud. For example, the user may input the furniture arrangement in the detection area to the detecting system 100. The processor 110 may determine that the subject will not pass through a specific area within the detection area according to the furniture arrangement. Therefore, the processor 110 may delete sampling points in the specific area to update the point cloud.

After obtaining the point cloud including a plurality of sampling points, the processor 110 may group the plurality of sampling points in the point cloud based on the sampling time to obtain a plurality of groups. The plurality of sampling points in the same group may have relatively similar sampling times, that is, multiple sampling points in the same group are sampled during the same time period. The plurality of sampling points in different groups may have less similar sampling times, that is, the plurality of sampling points in different groups are sampled during different time periods. It should be noted that the sampling periods of different groups may partially overlap. In other words, some sampling points may be included in different groups at the same time. For example, the processor 110 may use a sliding window with a length of 2 seconds to sample the groups. If the sliding window moves for 1 second per sampling, the sampling periods of adjacent groups will overlap by 1 second. For example, during the first sampling, the processor 110 utilizes a sliding window to sample sampling points from the 0th second to the 2nd second to generate the first group. Then, the processor 110 utilizes the sliding window to sample sampling points from the 1st second to the 3rd second to generate a second group. In this way, both the first group and the second group include sampling points detected between the 1st second and the 2nd second.

Next, the processor 110 may generate a plurality of bounding boxes respectively corresponding to the plurality of groups, such as the bounding box 410, the bounding box 420, or the bounding box 430 shown in FIG. 4. The processor 110 may connect the center (e.g., center of gravity or centroid) of each bounding box to generate the movement trajectory 400.

Taking the bounding box 410 and the bounding box 420 as an example, if the sampling point in the bounding box 410 is sampled during the first time period, the sampling point in the bounding box 420 may be sampled in a second time period different from the first time period, or may be sampled at the overlap of the first time period and the second time period.

In one embodiment, bounding boxes corresponding to later time periods may be overlaid on bounding boxes corresponding to earlier time periods. Taking FIG. 4 as an example, if the time period corresponding to the bounding box 420 is later than the time period corresponding to the bounding box 410 (i.e., the time (or average time) when one or more sampling points in the bounding box 420 are detected by the radar 120 is later than the time (or average time) when one or more sampling points in the bounding box 410 are detected by the radar 120), then the bounding box 420 may overlap the bounding box 410.

In one embodiment, the processor 110 may determine the color of the bounding box (or the type of line segment, such as a solid line or a dotted line) according to the distance between the bounding box and the reference location. Taking FIG. 4 as an example, assume that the reference location is (X,Y)=(0,0). The processor 110 may present the bounding box 410 in a lighter color based on the distance between the bounding box 410 and the reference location being less than or equal to a preset value, and may present the bounding box 410 in a darker color based on the distance between the bounding box 430 and the reference location being greater than the preset value.

In order to present the dwell time of the subject at different locations, in one embodiment, the processor 110 may determine the color of the bounding box according to a plurality of sampling times of a plurality of sampling points in the bounding box. Specifically, the processor 110 may calculate a difference between the sampling time of the earliest sampled sampling point in the bounding box and the sampling time of the latest sampled sampling point. If the difference is greater than a preset value, it means that the dwell time of the subject stayed at the location of the bounding box is longer. Accordingly, the processor 110 may present the bounding box in a darker color. If the difference is less than or equal to the preset value, it means that the dwell time of the subject stay at the location of the bounding box is shorter. Accordingly, the processor 110 may present the bounding box in a lighter color. Taking FIG. 4 as an example, if the subject stays at the location of the bounding box 410 for a short time period and stays at the location of the bounding box 420 for a long time period, the processor 110 may present the bounding box 410 in a lighter color and present the bounding box 420 in a darker color.

In one embodiment, the processor 110 may determine the color of the bounding box according to the number of bounding boxes at the same location. Specifically, if the number of the plurality of bounding boxes generated in the same area is greater than a preset value, it means that the subject has traveled through the area multiple times. Accordingly, the processor 110 may present the bounding boxes in a darker color. In addition, the plurality of bounding boxes for the same area may also be merged into a single bounding box. On the other hand, if the number of bounding boxes generated in the same area is less than or equal to the preset value, it means that the subject rarely travels through this area. Accordingly, the processor 110 may present the bounding box in a lighter color. Taking FIG. 4 as an example, if the number of times the subject passes the location of the bounding box 420 is greater than the number of times the subject passes the location of the bounding box 410, the processor 110 may present the bounding box 420 in a darker color and present the bounding box 410 in a lighter color.

In one embodiment, the processor 110 may determine the size of the bounding box based on a plurality of sampling times and velocities of the plurality of sampling points. For example, when the subject's walking speed is faster, displacement or offset is larger, or dwell time is longer, the range of the bounding box will be relatively large; on the contrary, when the subject's walking speed is slower, displacement or offset is smaller, or dwell time is shorter, the range of the bounding box will be smaller. It should be noted that the walking speed of the subject may include but is not limited to instantaneous velocity, average velocity, instantaneous acceleration, or average acceleration.

Figure 5:
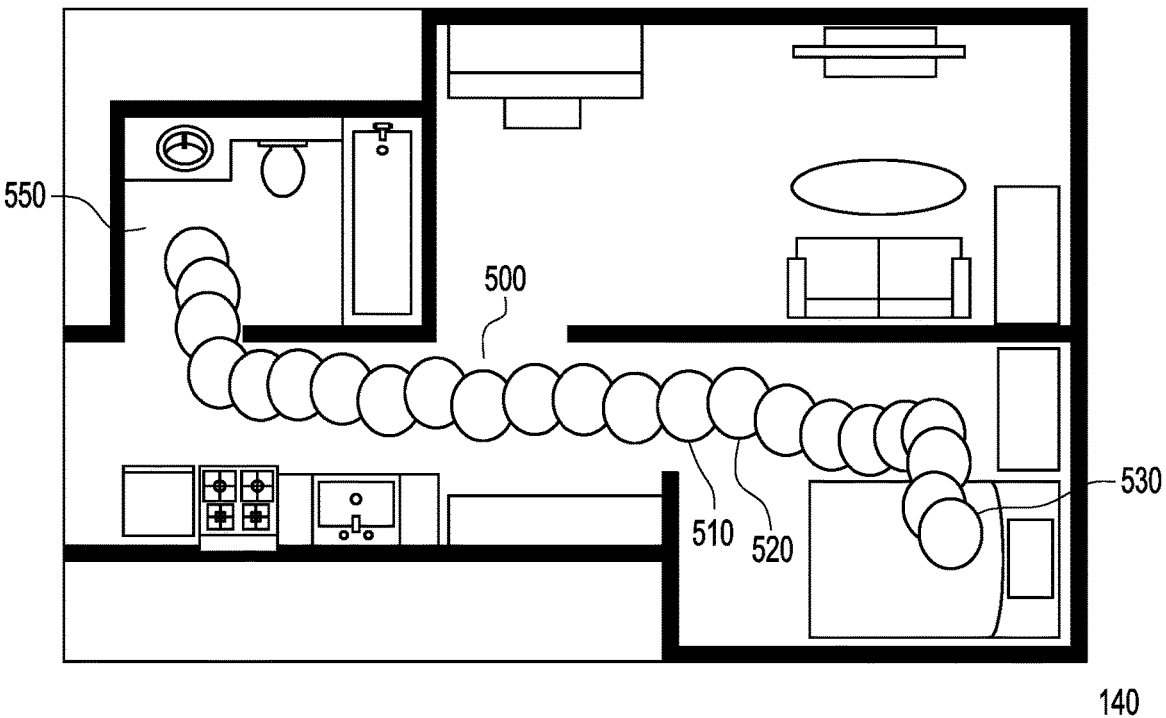
FIG. 5 is a schematic diagram of a movement trajectory in an indoor space displayed by a graphical user interface according to an embodiment of the present invention.

FIG. 5 illustrates a schematic diagram of a movement trajectory 500 in an indoor space displayed by the graphical user interface 140 according to an embodiment of the present invention. Movement trajectory 500 may include a plurality of bounding boxes (e.g., bounding boxes 510, 520, or 530). The processor 110 may detect the subject in the indoor space through the radar 120 to obtain the point cloud and generate a plurality of bounding boxes and the movement trajectory 500 according to the point cloud.

In one embodiment, the bounding box corresponding to the later time period may overlap the bounding box corresponding to the earlier time period. Taking FIG. 5 as an example, if the time period corresponding to the bounding box 520 is later than the time period corresponding to the bounding box 510 (i.e., the time (or average time) when one or more sampling points in the bounding box 520 are detected by the radar 120 is later than the time (or average time) when one or more sampling points in the bounding box 510 are detected by the radar 120), the bounding box 520 may overlap the bounding box 510.

In one embodiment, the processor 110 may determine the color of the bounding box (or the type of line segment, such as a solid line or a dotted line) according to the distance between the bounding box and the reference location. Taking FIG. 5 as an example, assume that the reference location is the reference location 550 representing the bathroom. The processor 110 may present the bounding box 510 in a lighter color based on the distance between the bounding box 110 and the reference location 550 being less than or equal to a preset value, and may present the bounding box 530 in a darker color based on the distance between the bounding box 530 and the reference location 550 being greater than the preset value.

In one embodiment, the processor 110 may determine the color of the bounding box according to a plurality of sampling times of a plurality of sampling points in the bounding box. Taking FIG. 5 as an example, if the subject stays at the location of the bounding box 510 for a short time period and stays at the location of the bounding box 530 for a long time period, the processor 110 may present the bounding box 510 in a lighter color and present the bounding box 530 in a darker color.

In one embodiment, the processor 110 may determine the color of the bounding box according to the number of bounding boxes at the same location. Taking FIG. 5 as an example, if the number of times the subject passes the location of the bounding box 510 is greater than the number of times the subject passes the location of the bounding box 530, the processor 110 may present the bounding box 510 in a darker color and present the bounding box 530 in a lighter color.

Figure 6:
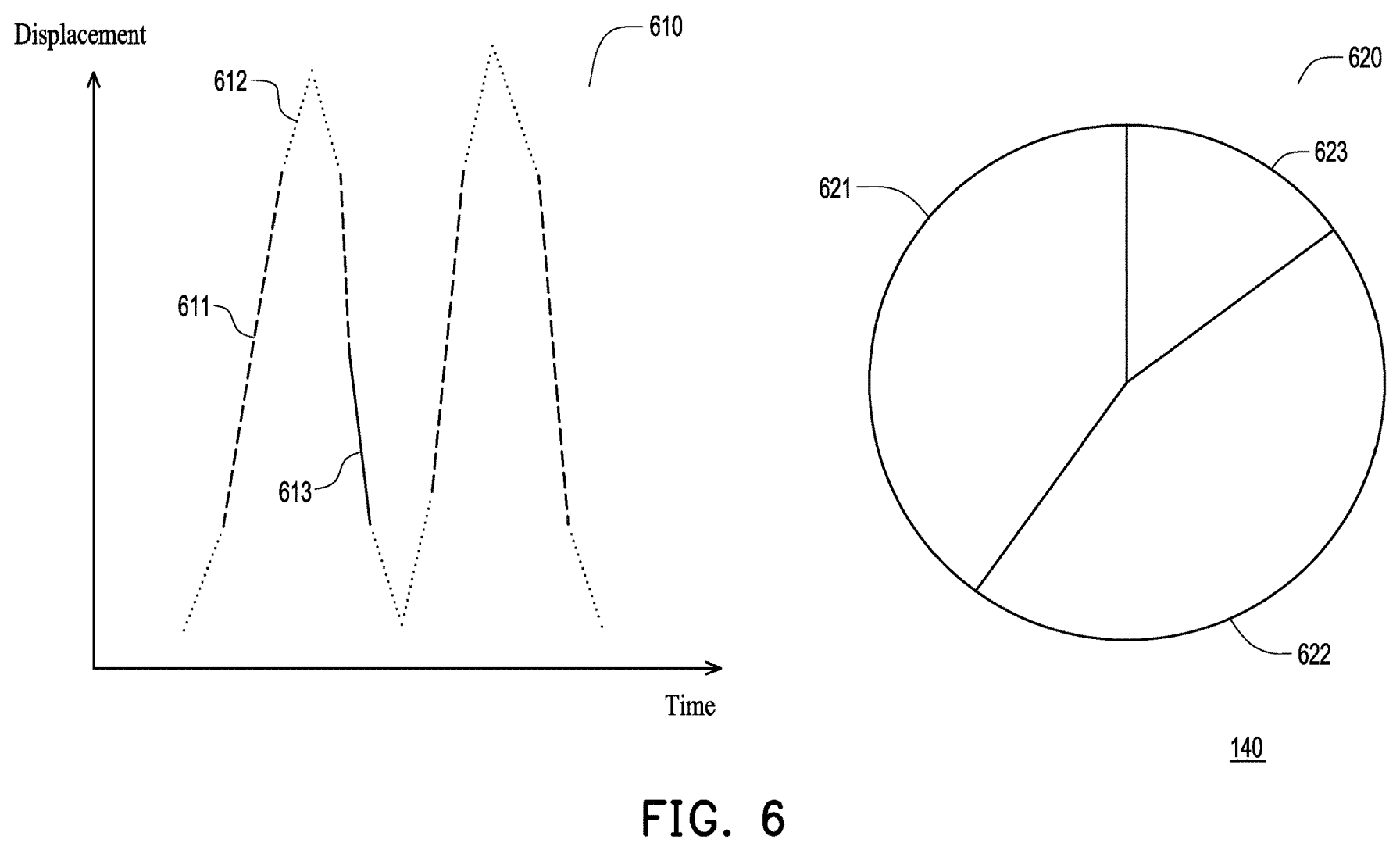

FIG. 6 illustrates a line chart 610 and a pie chart 620 corresponding to the movement trajectory according to an embodiment of the present invention. The processor 110 may display the graph 610 and the pie chart 620 through the graphical user interface 140 for user reference. In one embodiment, the processor 110 may determine the type of line segment used in the line chart according to the velocity of the subject. For example, the processor 110 may present the line segment 613 corresponding to the first velocity as a solid line, the line segment 611 corresponding to the second velocity as a dash line, and the line segment 611 corresponding to the third velocity as a dotted line, wherein the first velocity is greater than the second velocity, and the second velocity is greater than the third velocity. In one embodiment, the processor 110 may generate the pie chart 620 according to the velocity of the subject or the line chart 610, wherein the part 621 in the pie chart 620 represents the proportion of the displacement corresponding to the second velocity (or line segment 611) in the entire movement trajectory, the part 622 in the pie chart 620 represents the proportion of the displacement corresponding to the third velocity (or line segment 612) in the entire movement trajectory, and the part 623 in the pie chart 620 represents the proportion of the displacement corresponding to the first velocity (or line segment 613) in the entire movement trajectory.

Figure 7:
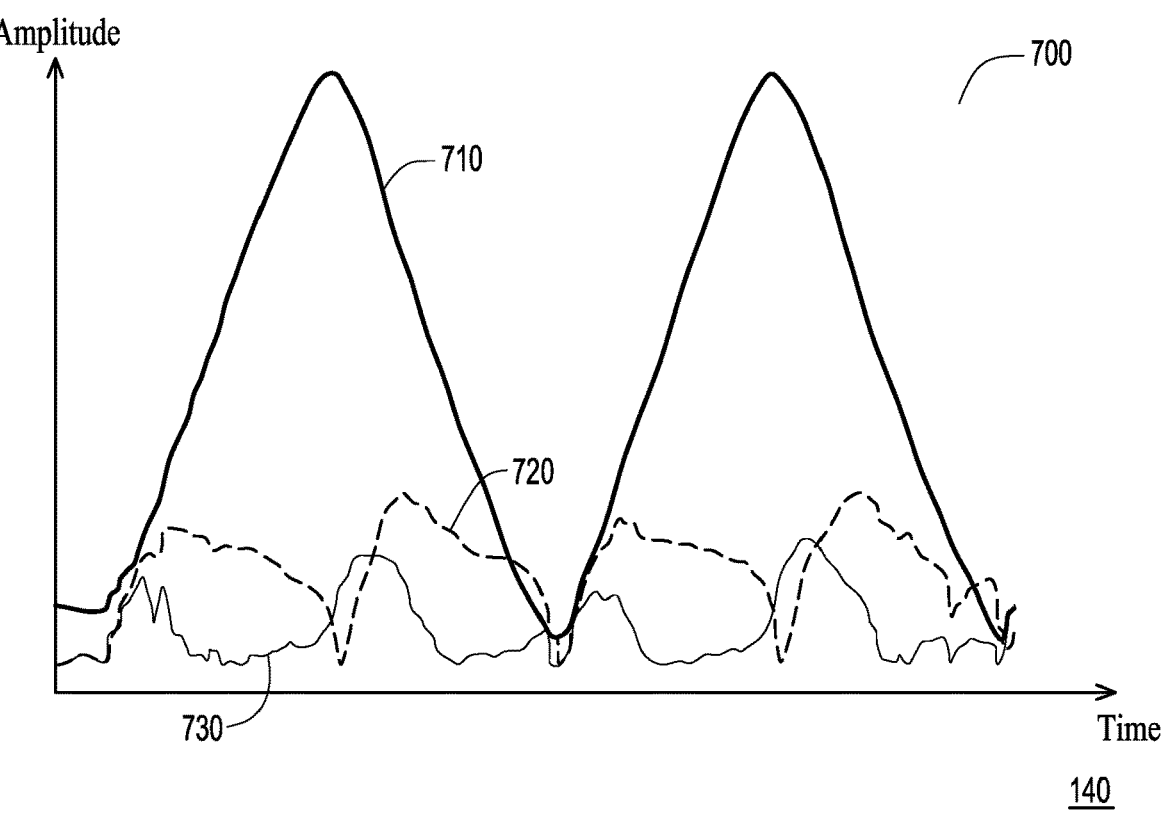
FIG. 7 is a line chart corresponding to the movement trajectory according to an embodiment of the present invention.

FIG. 7 is a line chart 700 corresponding to the movement trajectory according to an embodiment of the present invention. The processor 110 may display the line chart 700 through the graphical user interface 140 for user reference. Line chart 700 may include a curve 710 representing the displacement, a curve 720 representing the instantaneous velocity, or a curve 730 representing the instantaneous acceleration.

Figure 8:
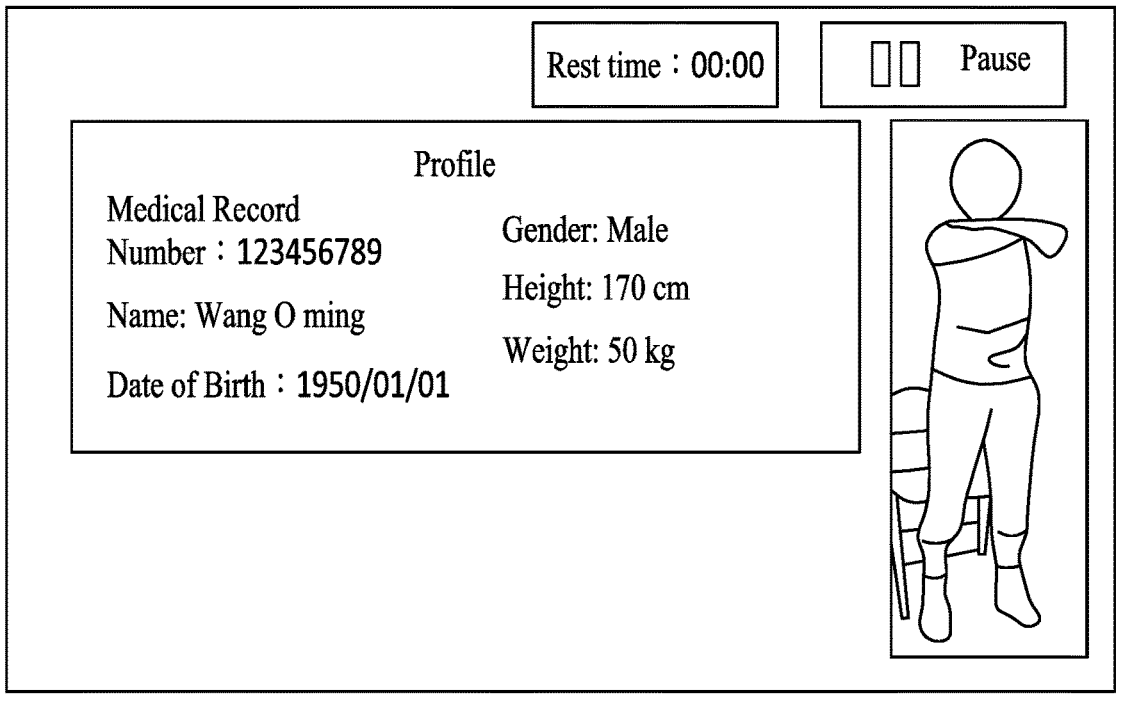
FIG. 8 is a schematic diagram of a graphical user interface while recording a subject performing a standing-sitting action according to an embodiment of the present invention.
Figure 9:
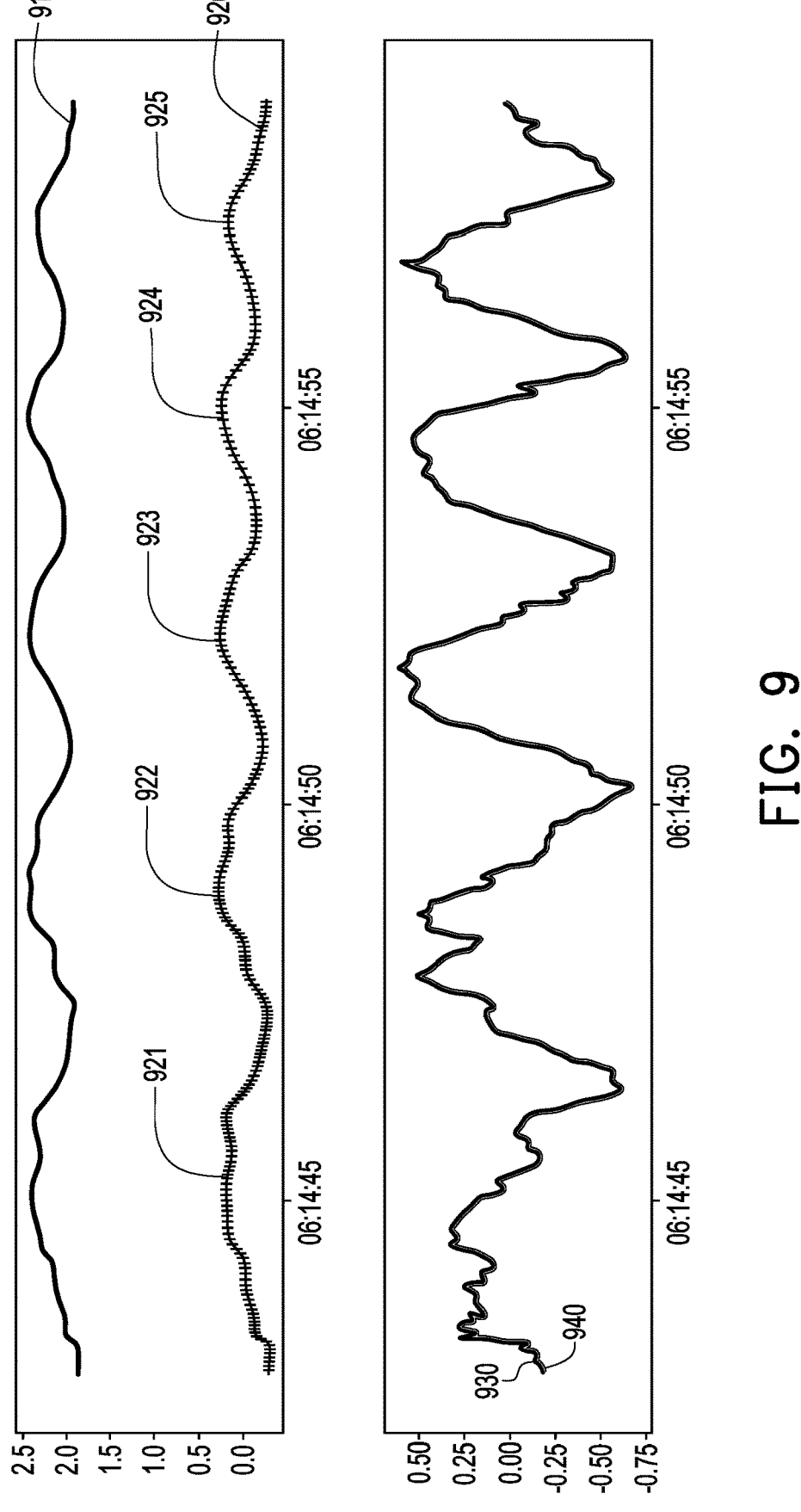
FIG. 9 is a line chart of a longitudinal displacement signal and longitudinal velocity signal of a subject according to an embodiment of the present invention.

The detecting system 100 may be used for measuring the number of times a subject performs a standing-sitting action within a time period. The number of standing-sitting actions may be used as a reference to measure the activity level of the subject, or to check whether the subject suffers from sarcopenia. FIG. 8 is a schematic diagram of a graphical user interface 140 while recording a subject performing a standing-sitting action according to an embodiment of the present invention. FIG. 9 is a line chart of a longitudinal displacement signal and longitudinal velocity signal of a subject according to an embodiment of the present invention.

Referring to FIGS. 8 and 9, in one embodiment, the processor 110 may measure the longitudinal displacement of the subject according to the point cloud obtained by the radar 120 to generate a longitudinal displacement signal 910. The processor 110 may perform a detrend operation on the longitudinal displacement signal 910 to update the longitudinal displacement signal 910, thereby generating the longitudinal displacement signal 920. Next, the processor 110 may perform normalization on the longitudinal displacement signal 920. For example, the processor 110 may perform normalization on the longitudinal displacement signal 920 according to equation (1) so that the amplitude of the longitudinal displacement signal 920 is between −1 and 1, wherein "y" represents the amplitude of the normalized longitudinal displacement signal 920, "max" represents the upper bound of the amplitude of the normalized signal (e.g., 1), "min" represents the lower bound of the amplitude of the normalized signal (e.g., −1), $x_{max}$ represents the maximum amplitude of the longitudinal displacement signal 920, and $x_{min}$ represents the minimum amplitude of the longitudinal displacement signal 920. After completing the normalization, the processor 110 may further perform smoothing on the longitudinal displacement signal 920 to update the longitudinal displacement signal 920.

$$\begin{cases} y = x_{std} * (\max - \min) + \min \\ x_{std} = (x - x_{min})/(x_{max} - x_{min}) \end{cases} \quad (1)$$

The processor 110 may perform peak detection on the updated longitudinal displacement signal 920 to obtain a plurality of peaks of the longitudinal displacement signal 920. The processor 110 may determine the number of times (e.g., 5 times) of the standing-sitting actions of the subject according to the plurality of peaks (e.g., peaks 921, 922, 923, 924, or 925). The processor 110 may display information including the number of times of the standing-sitting actions of the subject through the graphical user interface 140 for user reference.

In one embodiment, the processor 110 may measure the longitudinal velocity of the subject according to the point cloud obtained by the radar 120 to generate the longitudinal velocity signal 930. The processor 110 may perform a detrending operation on the longitudinal velocity signal 930 to update the longitudinal velocity signal 930, thereby generating the longitudinal velocity signal 940. Next, processor 110 may perform normalization on longitudinal velocity signal 940. The processor 110 may perform normalization on the longitudinal velocity signal 940 based on the same or similar manner as equation (1). After completing the normalization, the processor 110 may further perform smoothing on the longitudinal velocity signal 940 to update the longitudinal velocity signal 940.

The processor 110 may perform peak detection on the updated longitudinal velocity signal 940 to obtain a plurality of peaks of the longitudinal velocity signal 940. The processor 110 may determine the number of times of standing-setting actions of the subject according to the plurality of peaks. The processor 110 may display information including the number of times of the standing-sitting actions of the subject through the graphical user interface 140 for user reference.

Figure 10:
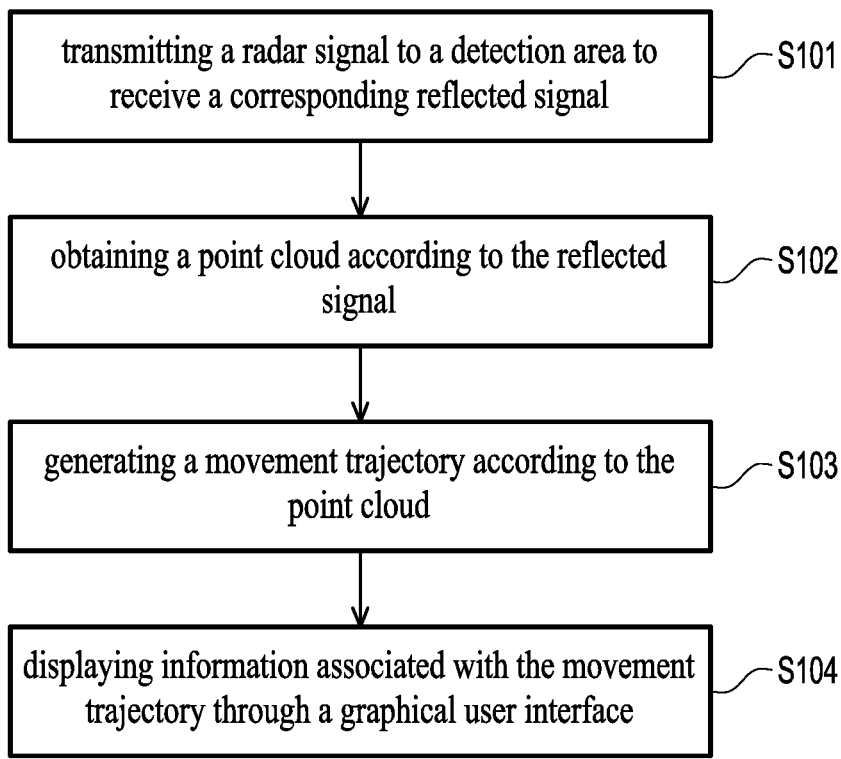
FIG. 10 is a flowchart of a detecting method for movement trajectory according to an embodiment of the present invention.

FIG. 10 is a flowchart of a detecting method for movement trajectory according to an embodiment of the present invention, wherein the detecting method may be implemented by the detecting system 100 shown in FIG. 1. In step S101, transmitting a radar signal to a detection area to receive a corresponding reflected signal. In step S102, obtaining a point cloud according to the reflected signal. In step S103, generating a movement trajectory according to the point cloud. In step S104, displaying information associated with the movement trajectory through a graphical user interface.

In summary, the present invention provides a non-contact movement trajectory detecting system, which may be used to detect the movement trajectory of the subject, and then analyze the information such as displacement, velocity, or movement offset of the subject. The detecting system of the present invention has excellent site adaptability and can be used indoors, outdoors, or in strong light environments. In addition, the detecting system of the present invention may be implemented in a terminal device that is lightweight or consumes little power (e.g., a smart phone), making it easy for users to carry it. Users may use the detecting system of the present invention to perform health examination for people in remote villages. Furthermore, the detecting system of the present invention can rapidly accomplish the detection of the movement trajectory and store the detection results as digital data for easy analysis. The detecting system of the present invention may also analyze the walking characteristics of the subject through machine learning algorithms, thereby providing users with multiple indicators to determine the activity level or walking ability of the subject.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A detecting system for movement trajectory, comprising:

a display device, displaying a graphical user interface;

a radar, transmitting a radar signal to a detection area to receive a corresponding reflected signal; and a processor, coupled to the radar and the display device and configured to:

obtain a point cloud comprising a plurality of sampling points derived from the reflected signal, wherein each of the plurality of sampling points has an associated timestamp;

group the point cloud to obtain a plurality of groups, comprising:

grouping a plurality of sampling points having time-stamps within a first time period from the point cloud to obtain a first group among the plurality of groups, generate a plurality of bounding boxes respectively corresponding to the plurality of groups, wherein the plurality of bounding boxes comprise a first bounding box corresponding to the first group;

generate a movement trajectory based on the plurality of bounding boxes;

calculate a difference between a timestamp of an earliest sampled sampling point and a timestamp of the latest sampled sampling point in the first bounding box to determine a dwell time of a subject at a location of the first bounding box;

determine a color of the first bounding box according to the dwell time; and display information associated with the movement trajectory through the graphical user interface, wherein the information comprises the color of the first bounding box.

2. The detecting system of claim 1, wherein the processor is further configured to:

obtain a plurality of centers respectively corresponding to the plurality of bounding boxes; and generate the movement trajectory according to the plurality of centers.

3. The detecting system of claim 2, wherein the plurality of groups further comprises a second group, and the processor is further configured to:

obtain a plurality of sampling points during a second time period from the point cloud to obtain the second group, wherein the second time period is different from the first time period.

4. The detecting system of claim 3, wherein the first time period and the second time period partially overlap.

5. The detecting system of claim 3, wherein the processor is further configured to:

determine the color of the first bounding box according to a distance between the first bounding box and a reference location.

6. The detecting system of claim 1, wherein the information further comprises at least one of the following: a displacement, an instantaneous velocity, an average velocity, an instantaneous acceleration, an average acceleration, a movement offset, and a dwell time.

7. The detecting system of claim 1, wherein the processor is further configured to:

obtain environmental information of the detection area; and filter a sampling point in the point cloud according to the environmental information to update the point cloud.

8. The detecting system of claim 1, wherein the processor is further configured to:

obtain a first longitudinal displacement signal according to the point cloud;

perform a detrending operation, a normalization, and a smoothing on the first longitudinal displacement signal to generate a second longitudinal displacement signal;

perform a peak detection on the second longitudinal displacement signal to obtain a plurality of peaks of the second longitudinal displacement signal; and determine a number of times of standing-sitting actions according to the plurality of peaks, wherein the information comprises the number of times of the standing-sitting actions.

9. The detecting system of claim 1, wherein the processor is further configured to:

obtain a first longitudinal velocity signal according to the point cloud;

perform a detrending operation, a normalization, and a smoothing on the first longitudinal velocity signal to generate a second longitudinal velocity signal;

perform a peak detection on the second longitudinal velocity signal to obtain a plurality of peaks of the second longitudinal velocity signal; and determine a number of times of standing-sitting actions according to the plurality of peaks, wherein the information comprises the number of times of the standing-sitting actions.

10. A detecting method for movement trajectory, comprising:

transmitting a radar signal to a detection area to receive a corresponding reflected signal;

obtaining a point cloud comprising a plurality of sampling points derived from the reflected signal, wherein each of the plurality of sampling points has an associated timestamp;

grouping the point cloud to obtain a plurality of groups, comprising:

grouping a plurality of sampling points having time-stamps within a first time period from the point cloud to obtain a first group among the plurality of groups, generating a plurality of bounding boxes respectively corresponding to the plurality of groups, wherein the plurality of bounding boxes comprise a first bounding box corresponding to the first group;

generating a movement trajectory according to the plurality of bounding boxes;

calculating a difference between a timestamp of an earliest sampled sampling point and a timestamp of the latest sampled sampling point in the first bounding box to determine a dwell time of a subject at a location of the first bounding box;

determining a color of the first bounding box according to the dwell time; and displaying information associated with the movement trajectory through a graphical user interface, wherein the information comprises the color of the first bounding box.

11. The detecting method of claim 10, wherein the step of generating the movement trajectory according to the point cloud comprises:

obtaining a plurality of centers respectively corresponding to the plurality of bounding boxes; and generating the movement trajectory according to the plurality of centers.

12. The detecting method of claim 11, wherein the plurality of groups further comprises a second group, and the step of grouping the point cloud to obtain the plurality of groups comprises:

obtaining a plurality of sampling points during a second time period from the point cloud to obtain the second group, wherein the second time period is different from the first time period.

13. The detecting method of claim 12, wherein the first time period and the second time period partially overlap.

14. The detecting method of claim 12, wherein the step of displaying the information associated with the movement trajectory through the graphical user interface comprises:

determining the color of the first bounding box according to a distance between the first bounding box and a reference location.

15. The detecting method of claim 10, wherein the information further comprises at least one of the following: a displacement, an instantaneous velocity, an average velocity, an instantaneous acceleration, an average acceleration, a movement offset, and a dwell time.

16. The detecting method of claim 10, further comprising:

obtaining environmental information of the detection area; and filtering a sampling point in the point cloud according to the environmental information to update the point cloud.

17. The detecting method of claim 10, further comprising:

obtaining a first longitudinal displacement signal according to the point cloud;

performing a detrending operation, a normalization, and a smoothing on the first longitudinal displacement signal to generate a second longitudinal displacement signal;

performing a peak detection on the second longitudinal displacement signal to obtain a plurality of peaks of the second longitudinal displacement signal; and determining a number of times of standing-sitting actions according to the plurality of peaks, wherein the information comprises the number of times of the standing-sitting actions.

18. The detecting method of claim 10, further comprising:

obtaining a first longitudinal velocity signal according to the point cloud;

performing a detrending operation, a normalization, and a smoothing on the first longitudinal velocity signal to generate a second longitudinal velocity signal;

performing a peak detection on the second longitudinal velocity signal to obtain a plurality of peaks of the second longitudinal velocity signal; and determining a number of times of standing-sitting actions according to the plurality of peaks, wherein the information comprises the number of times of the standing-sitting actions.

* * * * *